May 5, 1970  M. L. MOBERG ET AL  3,509,771

BREATH SAMPLING APPARATUS

Original Filed March 4, 1964  2 Sheets-Sheet 1

INVENTORS
ELMER MILTON WILSON
MILTON L. MOBERG

BY Edward O. Ansell
William E. Hiller
ATTORNEYS

May 5, 1970  M. L. MOBERG ET AL  3,509,771

BREATH SAMPLING APPARATUS

Original Filed March 4, 1964  2 Sheets-Sheet 2

INVENTORS
ELMER MILTON WILSON
MILTON L. MOBERG
BY

Edward D. Ansell
William E. Hiller
ATTORNEYS

United States Patent Office 3,509,771
Patented May 5, 1970

3,509,771
BREATH SAMPLING APPARATUS
Milton L. Moberg, Monrovia, and Elmer Milton Wilson, Altadena, Calif., assignors to Aerojet General Corporation, Azusa, Calif., a corporation of Ohio
Original application Mar. 4, 1964, Ser. No. 349,375, now Patent No. 3,338,087, dated Aug. 29, 1967. Divided and this application July 14, 1967, Ser. No. 668,726
Int. Cl. G01n 1/22
U.S. Cl. 73—421.5  3 Claims

ABSTRACT OF THE DISCLOSURE

Breath sampling apparatus including a housing for a sampler including means to maintain the sampler at approximately human body temperature. The sampler itself contains a body of material having a fusion temperature near body temperature. When the sampler is removed from the housing, the temperature maintaining material slowly changes from liquid to solid maintaining the sampler at body temperature for a significant period of time.

---

This is a division of copending application, Ser. No. 349,375, filed Mar. 4, 1964, now U.S. Patent No. 3,338,087.

The present invention generally relates to an apparatus for analyzing a gas stream, and more particularly to a portable apparatus and a sample-taking device forming a component thereof for analyzing the body fluid of a person to determine the existence and percentage of various substances in the body fluid, such as the presence of ethanol in the breath of a suspected drunken driver, for example.

In recent years, gas chromatography has gained acceptance as a suitable technique for analyzing a gaseous stream to determine the existence of various substances therein. Gas chromatography is a process in which physical separation between various substances in a gas stream occurs because of uniquely different affinities each substance may have for either adsorptive surfaces or liquid solutions across which a specimen to be tested is passed by an inert carrier gas.

Heretofore, apparatuses which have been developed to practice the foregoing technique of gas chromatography have been relatively complex in nature, requiring the use of skilled personnel for their operation. Such apparatuses also comprise rather cumbersome equipment of the type customarily associated with a specially-equipped laboratory and generally are substantially immobile because of their bulk and relatively high weight. Accordingly, these apparatuses utilizing the principles of gas chromatography to detect the presence and percentage of various substances in a gaseous stream have not been generally regarded as suitable for analyzing the breath of a person suspected of being intoxicated for the presence and percentage of ethanol in the breath because of their lack of portability and their high cost largely limiting them to use in specially-equipped laboratories.

Moreover, sample-taking devices heretofore known for collecting a sample of a person's breath to be subsequently analyzed as to the content of certain substances therein, such as ethanol, have not been entirely satisfactory. Such sample-taking devices are constructed so as to collect all of the breath from a person, which includes "mouth" air as well as lung air and to allow frequent condensation of the breath sample collected therein. In medical practices, it is recognized that "mouth" air does not represent a true measure of body respiratory products. Alveolar air or lung air is, however, considered to represent body equilibrium of respiratory products. If condensation occurs, a serious error factor is introduced because the condensation is responsible for reducing the amount of ethanol or other substances to be detected from the sample of breath so that a subsequent analysis of the breath sample by an apparatus utilizing the gas chromatography technique often renders a false lower reading of the percentage of the substance in the breath sample. One well-known form of sample-taking device for collecting a breath sample from a person suspected of intoxication is the so-called balloon type, in the use of which typical problems of the type described hereinabove are encountered so as to cause the breath sample collected therein to inaccurately reflect the percentage of a substance in the breath sample when it is later analyzed.

It is therefore an object of the present invention to provide a novel apparatus for analyzing the body fluid of a person to detect the presence and percentage of various substances therein, such as ethanol in the breath of a person where the person is suspected of being drunk, wherein the apparatus is highly accurate, light in weight, and relatively inexpensive as compared to gas chromatograph apparatuses of the laboratory type.

It is another object of the present invention to provide a novel apparatus utilizing the principles of gas chromatography for analyzing a gas stream and being particularly suitable for analyzing the breath of a person, wherein the apparatus is portable and can be readily operated by non-technical persons of average ability to provide accurate results in measuring and recording low concentrations of substances in a breath sample, such as ethanol in the breath of a person suspected of being intoxicated.

It is another object of this invention to provide a new and improved sample-taking device as a component of a breath analyzer utilizing the gas chromatography technique, wherein the sample-taking device is so constructed as to provide for the collection of a breath sample of alveolar air from the bottom of the lungs of a person whose breath is to be analyzed, while the so-called "mouth" air of the person is discarded in collecting the breath sample so that the breath sample more accurately reflects the respiratory products of the person at body equilibrium.

It is another object of this invention to provide a new and improved sample-taking device as a component of a breath analyzer utilizing the gas chromatography technique, wherein the sample-taking device is so constructed as to provide for substantially constant temperature of the breath sample over a significant period of time to prevent condensation of the breath sample before analysis thereof is undertaken.

Other objects and many of the attendant advantages of this invention will be readily appreciated as the same becomes better understood by reference to the following detailed description when considered in connection with the accompanying drawings wherein.

Figure 1:
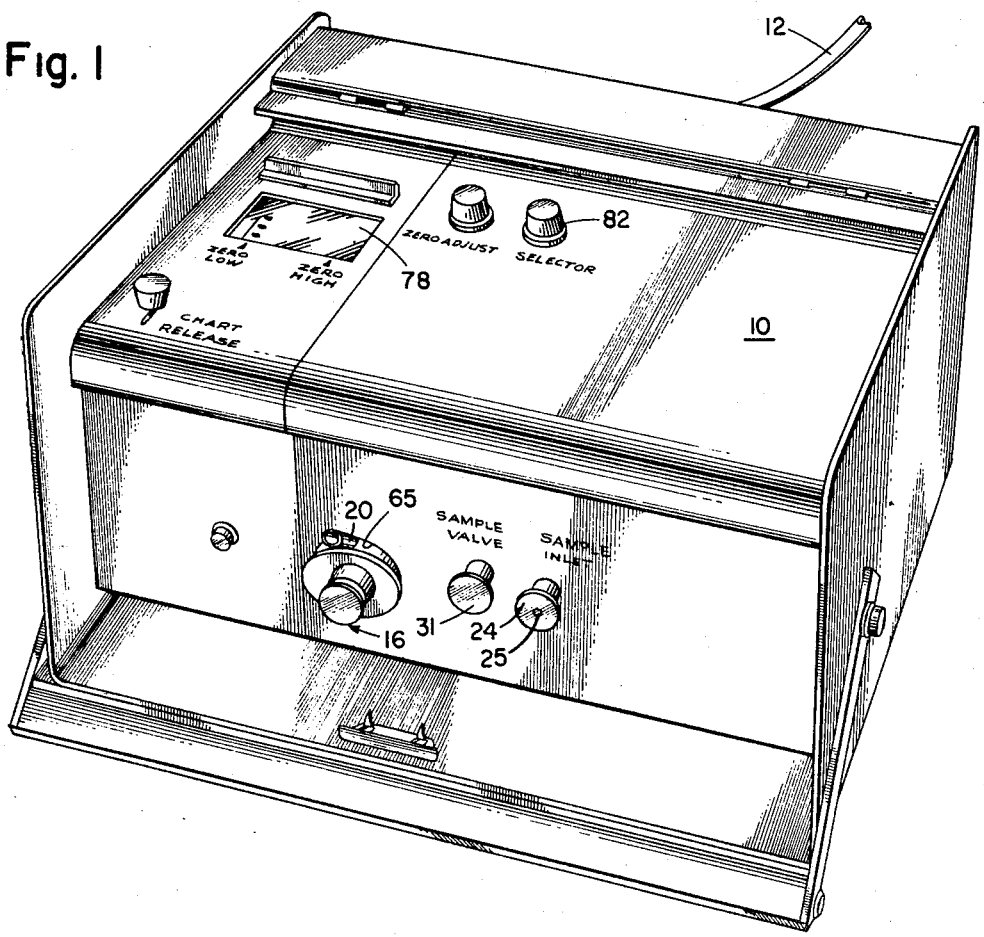
FIG. 1 is a perspective view of the improved apparatus for analyzing the breath of a person in accordance with the present invention.

Referring more specifically to the drawings, the improved apparatus for analyzing the body fluid of a person comprises a light-weight, relatively inexpensive, but highly accurate system embodying the principles of gas chromatography incased within a housing 10. While the apparatus will be herein described as being particularly adaptable to detect and determine the concentration of ethanol in the breath of a person suspected of being intoxicated, it will be understood that the apparatus is also contemplated as being suitable for analyzing the body fluid of a decreased person, for example, and for analyzing breath to determine the concentration of substances therein other than ethanol, such as oxygen, carbon dioxide, carbon monoxide, and nitrogen, as well as substances, such as marijuna and heroin, for example, and is able to differentiate each of these components without interference from each other.

In accordance with this invention, the apparatus or breath analyzer employs the technique of gas chromatography in that a source of an inert carrier gas 11 is connected to the system within the housing 10 by a conduit in the form of a flexible hose 12 for the purpose of sweeping breath sample through a separator assembly 13 to be later described, the separator assembly 13 causing a particular substance or substances in the breath sample to be physically separated from other constituents of the breath sample for subsequent quantitative detection by a detector 14. The flow of the inert carrier gas from the source 11 into the system through the hose 12 may be controlled by a manually operable valve 15.

The inert carrier gas may be any suitable gas having a much lower or higher thermal conductivity than air so that extremely small changes in composition may be measured. For instance, in the detection of ethanol in a breath sample taken from a person suspected of intoxication, the inert carrier gas may comprise Freon 12 which has a very low thermal conductivity, or helium or hydrogen which have a relatively high thermal conductivity, either gas having a thermal conductivity sufficiently different from the breath sample being analyzed to permit detection and analysis of minute quantities of a substance to be detected, such as ethanol. Where ethanol is the substance to be quantitatively detected, helium or hydrogen is preferred as the inert carrier gas. It will be understood, however, that use of the present apparatus for detecting substances other than ethanol may require an inert gas, other than Freon 12, helium, or hydrogen, as the carrier gas which has a thermal conductivity sufficiently different from the breath sample being analyzed.

A novel sample-taking device 16, to be hereinafter described in detail, is included as a component of the apparatus, the sample-taking device 16 being adapted to obtain a breath sample from a person which consists essentially of alveolar air or air taken from the bottom of the lungs of a person whose breath is to be tested. The sample-taking device 16 is equipped with a mouthpiece 18 which is connected to a breath inlet 20 of the sample-taking device 16 by flexible tubing 21. The mouthpiece 18 includes a plurality of baffles 22 therein which form a "spit trap" for collecting saliva in the mouthpiece 18 as a person blows thereinto, while permitting the breath of the person to pass through the mouthpiece 18 and the flexible tubing 21 into the inlet 20 of the sample-taking device 16.

When a breath sample has been collected in the sample-taking device 16, the outlet end 23 of the sample-taking device 16 which comprises a nozzle is inserted into the inlet end of the system. Operation of the analyzer system is best described in the patent application, Ser. No. 349,375, filed Mar. 4, 1964 and now Patent No. 3,338,087 issued Aug. 29, 1967. Suffice it to say the system is capable on the insertion of the sampling apparatus to remove the sample alveolar air and using gas chromatography to analyze the air for the presence of substances to be detected such as ethanol.

Figure 3:
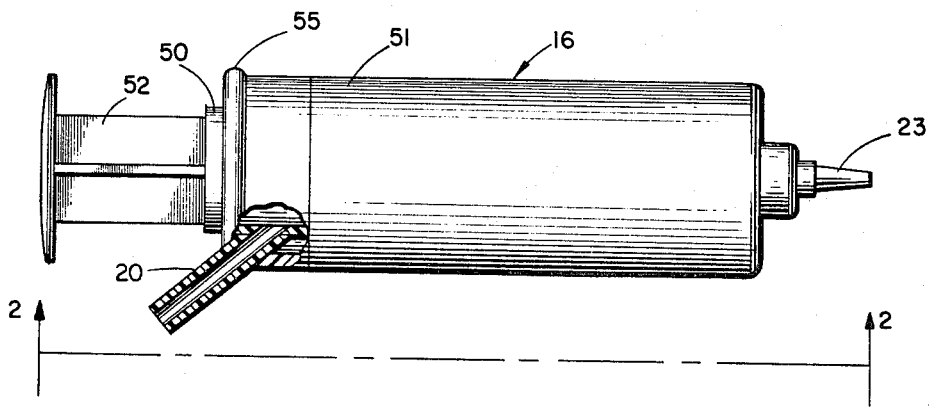
FIG. 3 is a side elevational view, partially in longitudinal section, of the novel sample-taking device forming a component of the apparatus.
Figure 4:
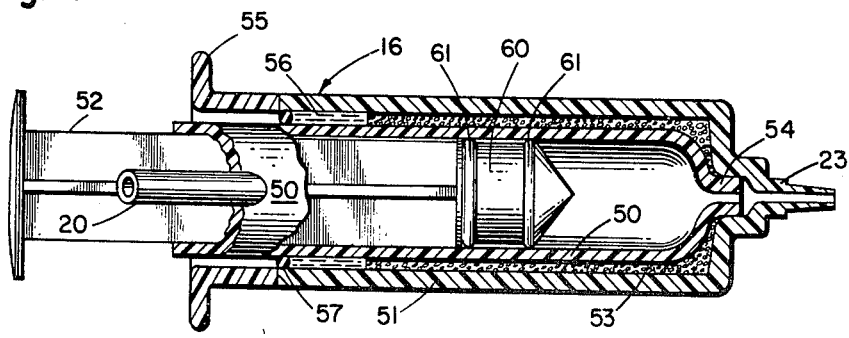
FIG. 4 is a longitudinal sectional view, partially in elevation, of the sample-taking device.

Referring now to the novel sample-taking device 16, as illustrated more particularly in FIGS. 3 and 4, the sample-taking device 16 comprises an inner receptacle 50, an outer receptacle 51 generally spaced radially outwardly from the inner receptacle 50, an injection member 52 slidably received within the inner receptacle 50, and a temperature-maintaining material in the form of a eutectic salt 53 in the space betwen the inner and outer receptacles 50 and 51. The tubular breath inlet 20 is disposed at one end of the sample-taking device 16 and communicates with the interior of the inner receptacle 50. The outlet nozzle 23 is disposed at the opposite end of the sample-taking device 16 and communicates with the interior of the inner receptacle 50. The inner receptacle 50 comprises a cylinder, one end of which is flared radially inwardly to terminate in an axially extending tubular tip 54, the tubular tip 54 of the inner cylinder 50 being snugly received within a throat portion at the corresponding end of the outer receptacle or cylindrical jacket 51 to communicate with the outlet nozzle 23 of the sample-taking device 16 which is formed integral with the outer cylindrical jacket 51. The outlet nozzle 23 is provided with an axially extending opening therethrough in registration with the opening through the tubular tip 54 of the inner cylinder 50 so as to provide an opening leading from the interior of the cylinder 50 through the nozzle 23. At its opposite end, the outer cylindrical jacket 51 is provided with an annular radially extending external flange 55 acting as a support against which the fingers of an operator may be placed to facilitate movement of the ejection member 52 into and out of the inner cylinder 50 in operating the sample-taking device 16 by forcing a sample of breath from the inner cylinder 50 through the outlet nozzle 23.

The temperature-maintaining material 53 disposed in the space between the inner cylinder 50 and the outer cylindrical jacket 51 preferably comprises a eutectic salt having a melting point approximating the normal body temperature of a person so that the temperature-maintaining material 53 may be heated, as hereinafter described, sufficiently to become liquefied (as partially illustrated at 56). Upon being liquefied, the temperature-maintaining material 53 serves to maintain a sample of breath contained within the inner cylinder 50 of the sample-taking device 16 at a substantially constant temperature over a significant period of time by releasing heat as the temperature-maintaining material 53 gradually solidifies, the heat released by the temperature-maintaining material 53 being its "heat of fusion." Any eutectic material having a melting point approximating the body temperature for a person may be suitably employed in the sample-taking device 16, one such material being calcium nitrate tetra-hydrate. The eutectic salt is retained in the space between the inner cylinder 50 and the outer cylindrical jacket 51 by a resilient sealing ring 57 which is inserted in the space between the inner cylinder 50 and the outer cylindrical jacket 51 at the end of the sample-taking device 16 remote from the nozzle 23 after the space has been filled by the eutectic salt 53 and sealingly engages the cylinder 50 and the jacket 51.

The ejection member 52 comprises a piston having a piston head 60 adapted to be slidably received within the inner cylinder 50 and carrying resilient O-ring seals 61 thereon for providing a fluid-tight seal between the piston head 60 and the inner cylinder 50 as the piston head 60 is slidably moved within the inner cylinder 50. In taking a sample of breath from a person, the operator first positions the piston 52 so that the piston head 60 is disposed at the open end or mouth of the inner cylinder 50 axially rearwardly of the tubular breath inlet 20. The person whose breath is to be analyzed then blows through the mouthpiece 18, and his breath is admitted into the inner cylinder 50 of the sample-taking device 16 by the tubular inlet 20 communicating therewith. The operator then pushes the piston 52 forwardly into the inner cylinder 50 so that the piston head 60 is disposed axially inwardly of the connection between the tubular inlet 20 and the cylinder 50 which traps a sample of breath within the inner cylinder 50. The relatively small-bore or restricted openings through the tubular tip 54 and the nozzle 23 of the sample-taking device 16 do not permit any significant diffusion between the trapped breath sample within the inner cylinder 50 and the atmosphere outwardly of the sample-taking device 16, nor is there any appreciable loss of the breath sample through the outlet nozzle 23. Moreover, so-called "mouth air" of the person whose breath is being analyzed is initially permitted to be discarded through the nozzle 23 of the sample-taking device 16. first, by virtue of the restricted opening through the nozzle 23 communicating with the interior of the inner cylinder 50 and the pressure sustained by the blowing of the person in collecting the breath sample, and secondly, by the action of the operator in partially pushing the piston 52 within the inner cylinder 50. Thus, the breath sample specimen is substantially alveolar air or lung air. The tubular loop 32 comprising the sample specimen trapping member is vented through its end 32b to atmosphere when the valve plunger 31 of the injector valve assembly 26 is disposed in its extended position. Accordingly, the breath sample to be analyzed by the system according to this invention comprises essentially alveolar air from the bottom of the lungs of a person whose breath is to be analyzed, the so-called "mouth" air being substantially discarded in the collection of the breath sample by the sample-taking device 16 and the subsequent ejection of the breath sample from the sample-taking device 16 into the system for analysis by pushing the piston 52 fully forward in the inner cylinder 50.

Figure 2:
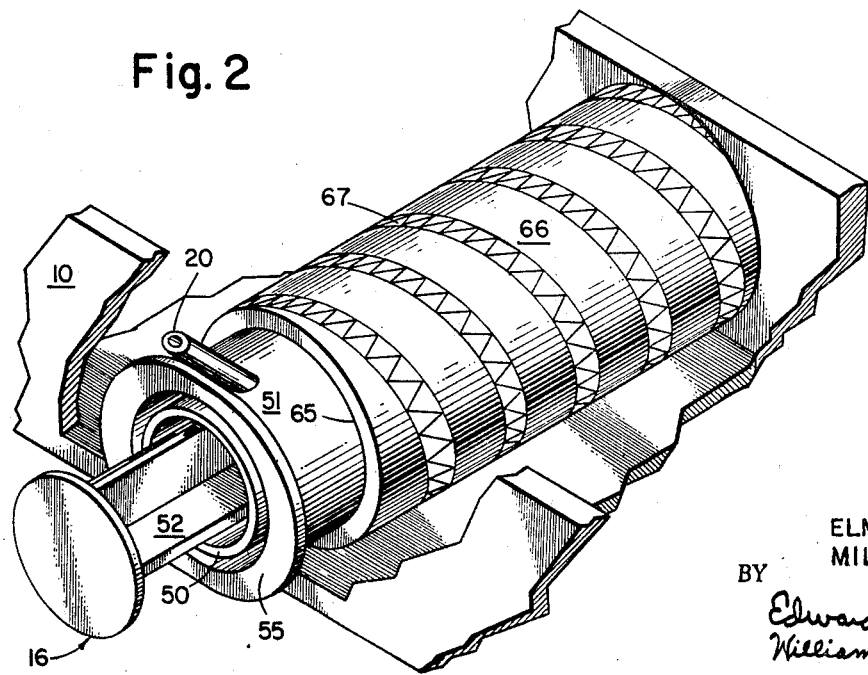
FIG. 2 is a fragmentary enlarged isometric view of a portion of the apparatus shown in FIG. 1, illustrating the details of a chamber in the housing of the apparatus and a novel sample-taking device removably received therein.

Referring to FIGS. 1 and 2, the sample-taking device 16 is normally removably received within a chamber 65 formed in the housing 10 and opening onto the front wall thereof. The chamber 65 is defined by a substantially cylindrical chamber wall 66 having suitable heating means associated therewith for heating the interior of the chamber so that the eutectic salt 53 of the sample-taking device 16 will melt and assume a liquid state when the sample-taking device 16 is received in the chamber 65. As shown in FIG. 2, the means for heating the chamber 65 may comprise electrical resistance wiring 67 coiled about the outer cylindrical surface of the chamber wall 66 and connected to a suitable source of electrical energy so as to become heated when energized.

The sample-taking device 16 is normally stored in the chamber 65 when not in use so that the eutectic material 53 will assume a liquid state when the electrical resistance wiring 67 in energized. When the sample-taking device 16 is subsequently used to collect a breath sample to be analyzed, the eutectic material 53 by releasing heat as it gradually solidifies maintains the breath sample at a substantially constant temperature approximating body temperature over a significant period of time should there be any delay in injecting the breath sample into the analyzing system to reduce any tendency of the breath sample toward condensation of the moisture therein which would introduce an error factor into the subsequent analysis of the breath sample by removing some of the ethanol therefrom.

It will be seen therefore that we have disclosed an improved apparatus for analyzing the breath of a person to determine the concentration of a substance such as ethanol therein. The apparatus while being highly accurate is portable because of its light weight and can be operated by non-technical personnel. The novel sample-taking device forming a component of the apparatus substantially eliminates any tendency of the breath sample collected therein toward condensation and thereby enhances the reliability of the results obtained from the analysis of the breath sample.

It will be understood that various modifications may be made in the specific embodiment herein disclosed without departing from the spirit of the present invention, and that the foregoing description and the accompanying drawings are not to be construed in a limiting sense.

We claim:
1. In an apparatus for analyzing a breath sample to determine the presence and concentration of a substance therein,
   (a) a housing having an outwardly opening chamber provided therein;
   (b) sample-taking means for collecting and temporarily retaining a sample of breath from a person, said sample-taking means being removably receivable within the chamber in said housing;
   (c) said sample-taking means including
      (1) an inner receptacle in which the breath sample is collected,
      (2) an outer receptacle surrounding the inner receptacle such that a space is provided therebetween, and
      (3) a temperature-maintaining material in the space between the inner and outer receptacles and having a melting point approximating the body temperature of a person; and
   (d) means for heating the chamber to a temperature sufficient to liquefy the temperature-maintaining material of said sample-taking means when said sample-taking means is received in the chamber;
   (e) said sample-taking means thereby maintaining the breath sample at a substantially constant temperature approximating the body temperature of a person for a significant period of time when removed from the chamber due to the heat released by the liquefied temperature-maintaining material as it gradually solidifies.

2. In an apparatus for analyzing a breath sample to determine the presence and concentration of a substance therein,
   (a) a housing having an outwardly opening chamber provided therein;
   (b) sample-taking means for collecting and temporarily retaining a sample of breath from a person, said sample-taking means being removably receivable within the chamber in said housing;
   (c) said sample-taking means including
      (1) an inner cylinder in which the breath sample is collected,
      (2) an outer jacket surrounding the inner receptacle such that a space is provided therebetween,
      (3) a eutectic material in the space between the inner cylinder and the outer jacket and having a melting point approximating the body temperature of a person,
      (4) a nozzle at one end of said sample-taking means having an opening communicating with the interior of the cylinder,
      (5) sealing means between said jacket and said cylinder to retain said eutectic material in the space therebetween,
      (6) means for admitting a breath sample into the cylinder, and
      (7) a piston slidably received within said cylinder and movable in a direction toward the nozzle for ejecting the breath sample from said cylinder through the opening in the nozzle; and
   (d) means for heating the chamber to a temperature sufficient to liquefy the temperature-maintaining material of said sample-taking means when said sample-taking means is received in the chamber;
   (e) said sample-taking means thereby maintaining the breath sample at a substantially constant temperature approximating the body temperature of a person for a significant period of time when removed from the chamber due to the heat released by the liquefied temperature-maintaining material as it gradually solidifies.

3. A sample-taking device for collecting and temporarily retaining a sample of breath from a person, said sample-taking device comprising:
(a) an outer receptacle;
(b) an inner receptacle spaced radially inwardly from said outer receptacle;
(c) a eutectic material in the space between said inner and outer receptacles, said eutectic material having a melting point approximating the body temperature of a person;
(d) means for admitting a breath sample into the inner receptacle; and
(e) storage means for said sample taking device including means for heating the sample taking device to fusion temperature of the eutectic material.

References Cited

UNITED STATES PATENTS

| 2,876,634 | 3/1959 | Zimmerman | 215—13 |
| 2,897,332 | 7/1959 | McFarlane. | |
| 3,196,689 | 6/1965 | Forrester et al. | 73—421.5 |

S. CLEMENT SWISHER, Primary Examiner

U.S. Cl. X.R.

128—2